US012441076B2

(12) United States Patent
Stojanovski

(10) Patent No.: US 12,441,076 B2
(45) Date of Patent: Oct. 14, 2025

(54) STAMPING APPARATUS

(71) Applicant: Slavoljub Stojanovski, Baesweiler (DE)

(72) Inventor: Slavoljub Stojanovski, Baesweiler (DE)

( * ) Notice: Subject to any disclaimer, the term of this patent is extended or adjusted under 35 U.S.C. 154(b) by 271 days.

(21) Appl. No.: 17/968,320

(22) Filed: Oct. 18, 2022

(65) Prior Publication Data

US 2024/0123702 A1 Apr. 18, 2024

(51) Int. Cl.
*B31B 50/59* (2017.01)
*B26F 1/44* (2006.01)
*B31B 50/14* (2017.01)

(52) U.S. Cl.
CPC .............. *B31B 50/592* (2018.05); *B26F 1/44* (2013.01); *B31B 50/142* (2017.08)

(58) Field of Classification Search
CPC ........ B31B 50/592; B31B 50/142; B26F 1/44
See application file for complete search history.

(56) References Cited

U.S. PATENT DOCUMENTS

| | | | | | |
|---|---|---|---|---|---|
| 5,052,992 | A * | 10/1991 | Hyder | B31B 70/00 | 493/82 |
| 5,067,339 | A * | 11/1991 | Pirchl | B26F 1/40 | 72/329 |
| 5,577,989 | A * | 11/1996 | Neary | B65D 65/403 | 493/902 |
| 6,604,399 | B1 * | 8/2003 | Yoshida | B26D 1/0006 | 72/325 |
| 2003/0221535 | A1 * | 12/2003 | Kraus | B26D 7/1854 | 83/932 |
| 2013/0025424 | A1 * | 1/2013 | Block | B26F 1/44 | 83/697 |
| 2015/0258702 | A1 * | 9/2015 | Harada | B31D 1/0043 | 83/690 |
| 2016/0367916 | A1 * | 12/2016 | Koehler | B26F 3/08 | |
| 2017/0057678 | A1 * | 3/2017 | Hauptmann | B65B 47/04 | |
| 2019/0299272 | A1 * | 10/2019 | Ockenfuss | B26F 1/40 | |
| 2019/0389009 | A1 * | 12/2019 | de Natris | B26F 1/44 | |
| 2021/0031027 | A1 * | 2/2021 | Tu | B26D 7/2614 | |

* cited by examiner

*Primary Examiner* — Omar Flores Sanchez
(74) *Attorney, Agent, or Firm* — Von Rohrscheidt Patents

(57) ABSTRACT

A stamping apparatus configured to stamp a material configured as a flat paper or cardboard web, the stamping apparatus including a machine frame; an upper part including at least one upper stamping tool configured as a male die; and a lower part including at least one lower stamping tool configured as a female die wherein the upper part is arranged movable in a linear manner relative to the machine frame, wherein the lower part is fixed at the machine frame, wherein an intermediary space is provided between the male die and the female die, wherein the material to be stamped is movable through the intermediary space in a direction perpendicular to a direction of a relative movement between the upper part and the lower part, wherein the material to be stamped is stampable by the relative movement between the upper part and the lower part.

16 Claims, 13 Drawing Sheets

STAMPING APPARATUS

RELATED APPLICATIONS

This application claims priority from German patent application DE 10 2021 127 601.2 filed on Oct. 25, 2021 which is incorporated in its entirety by this reference.

FIELD OF THE INVENTION

The instant invention relates to a stamping apparatus.

BACKGROUND OF THE INVENTION

Stamping apparatuses are used for cutting by stamping and have to satisfy stringent requirements with respect to load bearing capability, resistance to wear and dimensional precision. Typically, stamping tools are used to make flat parts from various materials e.g. metal, in particular sheet metal, synthetic material or paper or cardboard by cutting parts out using tool edges that function as cutting edges. In this context a material to be processed can either be fed cyclical or continuously respectively intermittent. In the latter case the material is typically wound from a roll and fed to the stamping apparatus as a continuous web.

A stamping apparatus of this type includes a machine frame and a top part including at least one stamping tool configured as a male die and a bottom part including at least one stamping tool configured as a female die. Thus, the upper part is move able on a linear path relative to the machine frame and the lower part is fixed at the machine frame. Furthermore, there is an intermediary space between the male die and the female die wherein the material to be stamped is movable through the intermediary space in a direction perpendicular to the direction of the relative movement between the upper part and the lower part. The material is then stampable by the relative movement between the upper part and the lower part due to the engagement of at least one respective stamping tool of the upper part with a stamping tool of the lower part. Furthermore, each stamping tool includes at least one cutting element respectively including at least one circumferential cutting edge. The upper stamping tool is moved during the stamping process e.g. by a hydraulic device with pressure onto the material to be processed and cuts the material through cooperation with the lower stamping tool.

Stamping apparatuses are typically used in production plants as part of a transfer line, this means other machines are arranged upstream or downstream of the stamping tool. Thus, the machines are adapted to each other so that a continuous flow is provided even when the material is transferred between the machines.

When the stamping tool is operated the typically web shaped material runs through the intermediary space between the male die and the female die when the material is fed to the stamping tool as a web from an upstream machine. Thus, the material is inserted into the stamping apparatus, thus into the intermediary space so that the male die is arranged above the material and the female die is arranged below the material.

In order to cut the material into a desired shape the male die is moved top down towards the female die. Thus, the male die and the female die have a corresponding shape so that the male die at least substantially engages the female die. Put differently the male die is configured so that it can at least substantially run through the female die or at least penetrate into the female die. Thus, planes of the cutting edges of the male die and the female die have to pass through one another.

When the desired shape is e.g. a circle with a particular diameter that is required e.g. for producing blanks for cardboard plates the male die has a cross section that has at least substantially this diameter. Accordingly, the male die also has a circular cross section which is slightly smaller than the diameter of the female die. This way the male die can engage the female die thus punch into the female die or at least substantially punch through the female die since the male die is smaller than the female die. Put differently, the male die is moved towards the material from above, contacts and engages the material and subsequently punches through the female die together with the material so that the material is cut and/or perforated. Thus, edges of the male die and the female die move past each other in parallel like two cutting edges and thus cut the material. This creates the desired stamped shape at least substantially in the shape of the male die or the female die. The stamped shape is also designated as a stamped blank and then falls downward out of the female the and is transported e.g. to a subsequent machine for further processing. In order to release the stamped blank from the remaining material a wiper can be provided which presses the stamped blank out when the male die moves up.

In a portion where the stamping tool contacts the material, the stamping tool includes at least one cutting element. At least this cutting element penetrates cuts or stamps the material during operations over and over again. Put differently, the male die and the female die include a cutting element that is configured to cut the material. Thus, the cutting elements are exposed to large forces so that the cutting elements wear during a life cycle and require replacement. Furthermore, regular maintenance is required. Idle times thus required have to be reduced to a minimum.

For a different job, thus when a different material shall be processed and/or a different shape is to be produced the stamping tool has to be replaced. This is designated as set up time and is a significant cost driver in addition to the idle times recited supra.

In this context the stamping tool has to be replaced or serviced in its entirety when e.g. a new job is to be run or when a damage has occurred in particular at the cutting element. Though modern stamping apparatuses are configured in particular so that their components, in particular the stamping tools are mountable or dismountable e.g. by a quick lock system, it has become evident in practical applications that the associated processes are still complicated and time consuming and therefore cause long shut down times and thus high cost. In particular precisely adjusting the male die and the female die relative to each other is complex and has to be performed again after each change of the cutting tools.

E.g. when the cutting element is worn the entire stamping die with the cutting element arranged thereon has to be disassembled. Subsequently a new stamping tool is inserted which then has to be aligned again which makes this change time consuming.

This is caused e.g. by the stringent requirements with respect to dimensional and shape precision. Between the female die and the male die a minimal cutting gap is provided that allows the male die to run through the female die. Before the cutting tools are put into operation the cutting gap and a clearance between the male die and the female die has to be checked. Influencing parameters of the cutting gap are e.g. tensile strength and thickness of the material. Typically, the cutting gap has a size of two to five percent of the material thickness. The cutting gap is typically checked by an angle tester or height tester. Put differently, care has to be taken when mounting the male die and the female die so that they are precisely aligned.

It is certainly a disadvantage of the prior art that it is very complex to exchange the male die and the female die in particular because they have to be precisely aligned. This is very labor intensive and thus expensive.

BRIEF SUMMARY OF THE INVENTION

Thus, it is an object of the invention to provide a stamping tool that overcomes the disadvantages of the prior art and that can be maintained in a particularly simple manner and can thus be operated in a particularly cost effective and resource conserving manner.

The object is achieved by A stamping apparatus configured to stamp a material configured as a flat paper or cardboard web, the stamping apparatus including a machine frame; an upper part including at least one upper stamping tool configured as a male die; and a lower part including at least one lower stamping tool configured as a female die wherein the upper part is arranged movable in a linear manner relative to the machine frame, wherein the lower part is fixed at the machine frame, wherein an intermediary space is provided between the male die and the female die, wherein the material to be stamped is movable through the intermediary space in a direction perpendicular to a direction of a relative movement between the upper part and the lower part, wherein the material to be stamped is stampable by the relative movement between the upper part and the lower part due to an engagement of at least one stamping tool of the upper part in an associated at least one stamping tool of the lower part, wherein each of the at least one upper stamping tool and the at least one lower stamping tool includes at least one cutting element respectively including at least one circumferential cutting edge and wherein at least one cutting edge arranged in the upper part cooperates with at least one cutting edge arranged in the lower part as opposite cutting edges, wherein the at least one cutting element is connected with the at least one upper stamping tool and the at least one lower stamping tool in a disengageable manner. Advantageous embodiments are defined in the dependent claims.

According to the invention the at least one cutting element is removably attached at the stamping tool and/or at the male die. Thus, the cutting element can be replaced in a particularly simple manner when the cutting element is worn. Since the cutting element is connected to the stamping tool and/or the female die in a disengageable manner, the stamping tool and/or the female die do not have to be aligned again when the cutting element is replaced as long as the cutting element is fitted into the cutting tool and/or the male die with a sufficiently small tolerance. Put differently the cutting element can be replaced without having to uninstall or realign the entire stamping tool. This has the advantage that the cutting tool can be replaced in a particularly quick and therefore cost-effective manner.

Furthermore, the cutting edges are typically made from a robust and wear resistant material, e.g. from hard metal. Hard metal and in particular machining hard metal is expensive. In the prior art typically at least substantially the entire stamping tool is made from this robust material. To the contrary the configuration according to the invention facilitates making only the cutting element from the robust material and making the stamping tool itself from a relatively inexpensive material. When the cutting element is replaced due to wear or defect only the cutting element becomes scrap. On the other hand side, the entire prior art stamping tool is replaced so that much more scrap material needs to be disposed of. Thus, it is an advantage of the invention that the stamping tool can be operated in a particularly cost effective and resource saving manner.

According to an advantageous embodiment of the invention the upper part includes plural stamping tools respectively including a cutting element. This has the advantage that plural dies can be used simultaneously so that the stamping apparatus is operable in a particularly efficient manner.

According to an advantageous embodiment of the invention the upper part includes a carrier plate where the plural cutting tools are attached so that they protrude beyond the carrier plate towards the lower part. This way the cutting tools are alignable particularly well since they are alignable relative to each other and relative to the carrier plate. This has the advantage that the cutting tools can be aligned in a particularly simple and precise manner.

According to another particularly advantageous embodiment of the invention the female die includes plural cutting elements which yields the advantages recited supra.

According to another advantageous embodiment the female die includes precisely one cutting element with plural cutting edges. The cutting element can be configured at least essentially in one piece so that it can be produced in a particularly simple, cost effective and economical manner. For the same reason the cutting element can be replaced in a particularly simple manner since only the one cutting element has to be replaced.

Another advantageous embodiment of the invention is characterized in that the cutting element is plate shaped and rests flat on a carrier plate arranged in parallel the cutting element and connected therewith, wherein the carrier plate advantageously includes cutouts into which the cutting elements of the male die can penetrate. Since the cutting element rests flat on the carrier plate the cutting element is in contact with the carrier plate. Forces impacting the cutting element are initially received by the cutting element and can then be introduced into the carrier plate. This reduces a load on the cutting element since forces impacting the cutting element are at least partially absorbed by the carrier plate. Thus, the cutting element can be provided from a particularly robust material with high resistibility particularly suitable for cutting. Put differently the cutting element can be made from a heat treated special steel. High levels of hardness and resistance to wear of the material used come with a rather low level of resistance to fracture and/or bending resistance. Therefore the material used for the cutting element is typically unsuitable to absorb forces. Thus, the carrier plate can be made from a particularly force absorbing material so that the forces from the cutting element can be absorbed particularly well. This has the advantage that the cutting element can be operated with particularly low wear to achieve a particularly long service life. This supports operations of the stamping tool with low resource consumption and low cost.

In another advantageous embodiment the stamping apparatus is configured so that the male die includes plural cutting elements respectively including exactly one cutting edge. This male die has shown in operations to have a particular long service life. Furthermore the cutting element can be replaced in a particularly simple manner.

In an advantageous embodiment an outer enveloping surface of the cutting element is configured conical so that an enveloping line viewed in a sectional view transversal to an axis direction of the cutting element runs at an angle relative to the axis direction. Thus, an interface is formed between the cutting element and the cutting tool, wherein the enveloping line of the cutting element defines a conical shape of the cutting element at least partially. This yields the advantage that the cutting element can be moved in a very simple manner through its opposite piece, thus the female die or the male die. Put differently the cutting element slides into its opposite piece particularly well due to its conical shape. This has the advantage that the stamping tool is operable in a particularly reliable manner. On the other hand side the cutting element can be mounted in a particularly simple manner for the reasons recited supra. Thus, the stamping tool can be advantageously operated in a particularly simple and intuitive manner.

According to an advantageous embodiment of the invention the cutting element terminates flush with a top side of the stamping tool. An assembly condition of the cutting element can thus be visually checked for correctness. Put differently, the cutting element is mounted correctly when it terminates flush with a top side of the stamping tool. Thus, the stamping tool can be assembled in a particularly simple manner operated in a particularly reliable manner.

According to an advantageous embodiment the stamping apparatus includes a separation plane between the tool and the cutting element, wherein the separation plane is orthogonal to a direction of a relative movement. Operations have shown that a cutting element according to this embodiment can be separated from the tool in a particularly simple manner. It is sufficiently intuitive when the cutting element is disengageable parallel to its relative movement. According to this embodiment the cutting element can be pulled off in a downward direction after disengaging corresponding fastening elements so that the cutting element can be separated from the tool.

According to an advantageous embodiment of the stamping apparatus the cutting edge of at least one of the cutting elements is configured circumferentially closed. Since the cutting edge is circumferentially closed the blank can be released from the material particularly cleanly and without being damaged. Advantageously the stamping apparatus operates very reliably this way.

According to another advantageous embodiment the stamping apparatus includes a centering pin which aligns the cutting element at the stamping tool or at a base element thereof with a unique orientation. This helps an inexperienced operator to align the cutting element correctly. Put differently a mounting position of the cutting element is predetermined by the centering pin. Thus, the stamping tool can be operated in a particularly intuitive and simple manner.

According to another advantageous embodiment the cutting element is centered by a centering element. Thus, the centering element and the cutting element can be connected with each other. This is done so that the centering element can be aligned before start of operations so that the position of the cutting element is predetermined. Additionally the centering element is connected or connectable with the carrier plate by centering pins. Put differently, not the cutting element itself, but a unit including the cutting element and the centering element are aligned so that the alignment or position of the unit determines the alignment or position of the cutting element. This has the advantage that the cutting element can be replaced or maintained and can be placed on the centering element without alignment so that the cutting element is aligned automatically. This helps efficient operations of the stamping tool with respect to setup times and idle times for maintenance.

Advantageously at least one advantageously circular or frame shaped centering element is arranged between a cutting element and a base element of the upper part or the lower part. Thus, the at least one centering element and the cutting element are fixable against a movement in a direction perpendicular to the direction of the relative movement between the upper part and the lower part by positive form locking. However, the centering element and the cutting element are movable as an assembled unit relative to the base element in various directions perpendicular to the direction of the relative movement between the upper part and the lower part and fixable in various positions relative to the base element. This has the advantage that the centering element and the cutting element can be tailored to respective operational requirements.

Advantageously the centering element includes a centering collar. Operations have shown that the cutting element is attached at the centering element particularly reliably when a circular centering collar is used. Furthermore the cutting element can be mounted and dismounted by the operator particularly well this way by applying the cutting element to the centering collar or removing it from the centering collar. Thus, the stamping tool can be maintained in a particularly intuitive and simple manner.

According to an advantageous embodiment a centering recess is provided in which the centering element is receivable. This centering recess can be milled into the carrier plate so that the centering element can be placed into the centering recess. Furthermore the centering recess can be slightly larger than the centering element so that the centering element is movable in the centering recess with a small amount of clearance. Thus, the centering element can be mounted particularly reliably and can be aligned particularly precisely.

According to an advantageous embodiment of the invention the cutting elements of the upper part and/or the at least one cutting element of the lower part are annular, in particular circular or frame shaped. This shape of the cutting element has proven particularly robust during operations. This has the advantage that the stamping apparatus is particularly resistant to wear and therefor operates with low resource consumption. In this context it can be provided that the cutting element includes a "roof", this means that cutting edges of the cutting element drop from an inside out. Put differently the gable of the roof at least essentially coincides with the diameter, whereas the individual "roofs" or "roof sides" drop from the gable towards an edge of the circular cutting element. This way the cutting element contacts first with its highest point, namely the gable. Consequently the cutting element penetrates the material to be stamped with a reduced contact surface. Put differently forces generated by the stamping tool are distributed over a relatively small contact surface so that a surface pressure is particularly high. Therefore the material to be stamped can be cut reliably. Advantageously the stamping tool can be operated with particularly low force and thus with low energy consumption.

BRIEF DESCRIPTION OF THE DRAWINGS

The invention is subsequently described based on advantageous embodiments with reference to drawing figures, wherein.

DETAILED DESCRIPTION OF THE INVENTION

Figure 1:
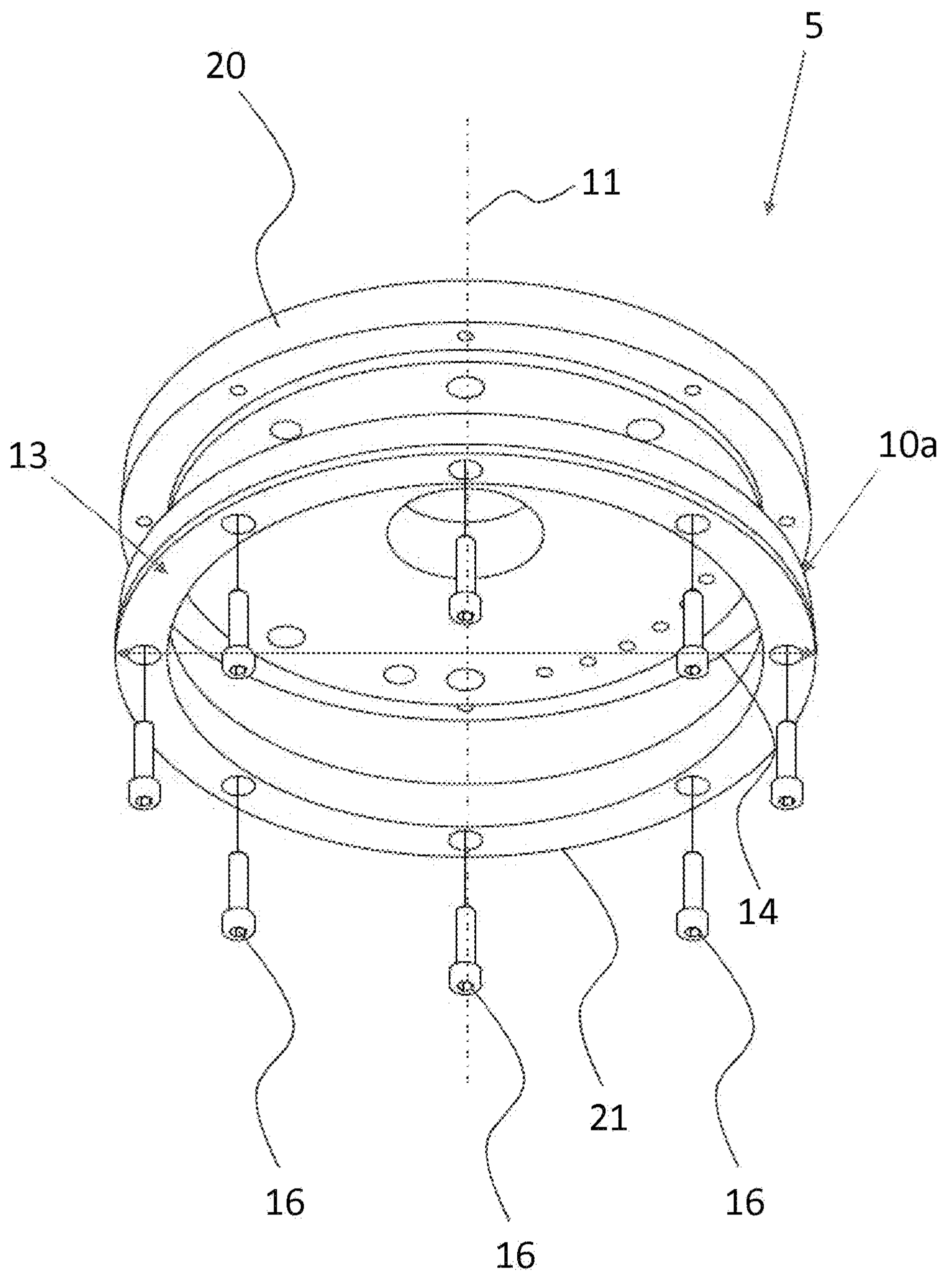
FIG. 1 illustrates a schematic perspective view of a male die of the stamping tool according to the invention from above.

A stamping apparatus 1 according to the invention for stamping a material 2, in particular flat paper or cardboard webs comprises a machine frame 3, an upper part 4 with four stamping dies 5 configured as male dies 6 and a lower part 7 with four stamping tools 5*o* configured as a female die 8. Thus the upper part 4 is movably arranged relative to the machine frame 3. Furthermore the lower part 7 is fixed at the machine frame 3. Furthermore an intermediary space 9 is provided between the male die 6 and the female die 8, wherein the material 2 to be stamped can be run through the intermediary space 9 so that the material 2 is stampable by a relative movement between an upper part 4 and the lower part 7 due to an engagement of at least one stamping tool 5*o* of the upper part 4 with a stamping tool 5*u* of the lower part 7 (stamping position). Each stamping tool 5*o*, 5*u* includes a cutting element 10*a*, 10*b* that is disengageably connected at the stamping tool 5*o*, 5*u* and/or at the female die 8.

The upper part 4 is attached by four linear guides configured as guide pins 17 at the machine frame 3 so that the upper part 4 can be moved up and down. Furthermore the lower part 7 is attached at the machine frame 3 by bolts 16, so that the lower part is essentially fixed in place. Due to the support pins 17 the upper part 4 is centered relative to the machine frame 3 so that the upper part is movable on a precise path.

Figure 3:
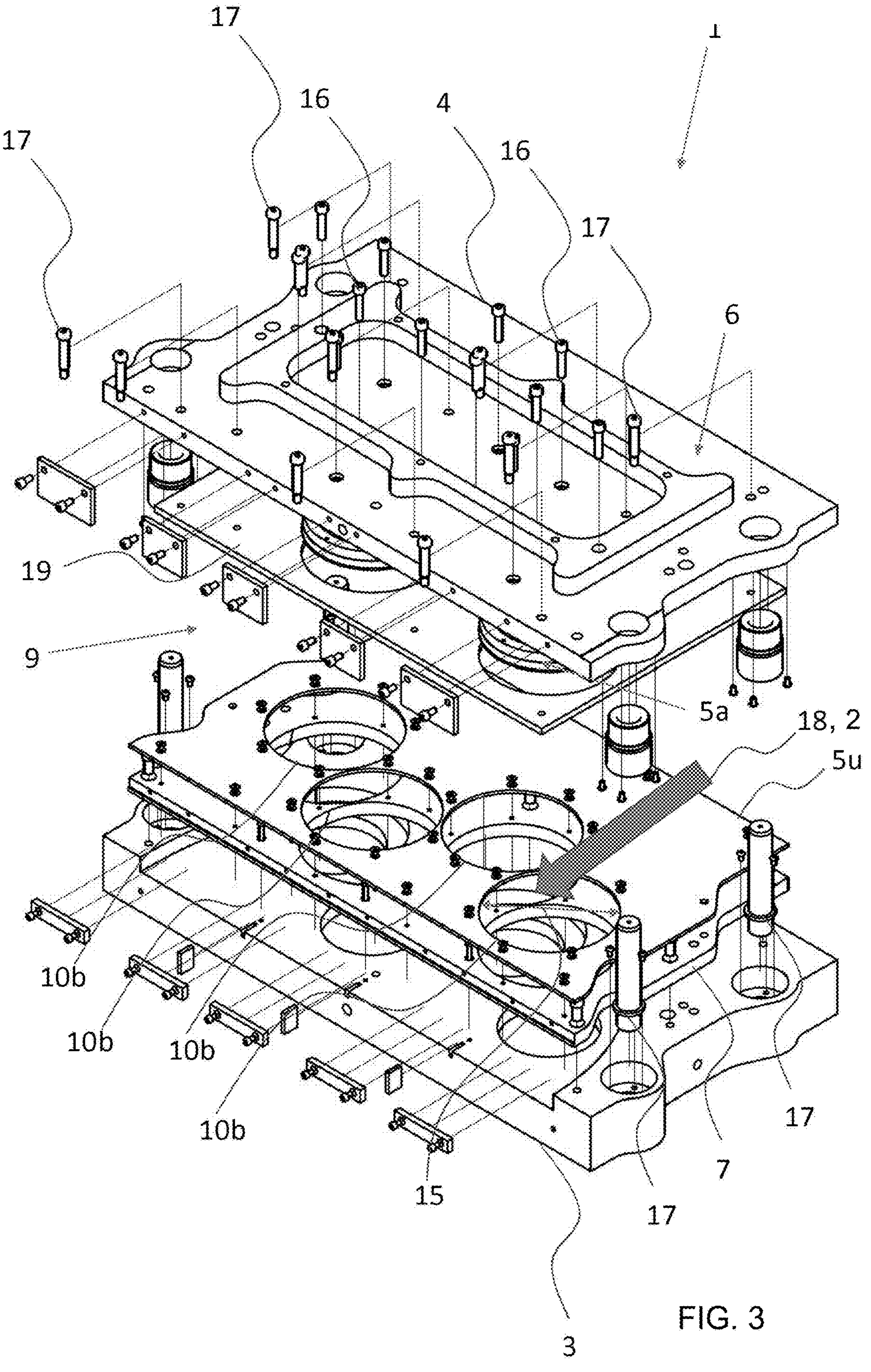
FIG. 3 illustrates a schematic exploded view of the stamping apparatus according to the invention from an upper right.
Figure 4:
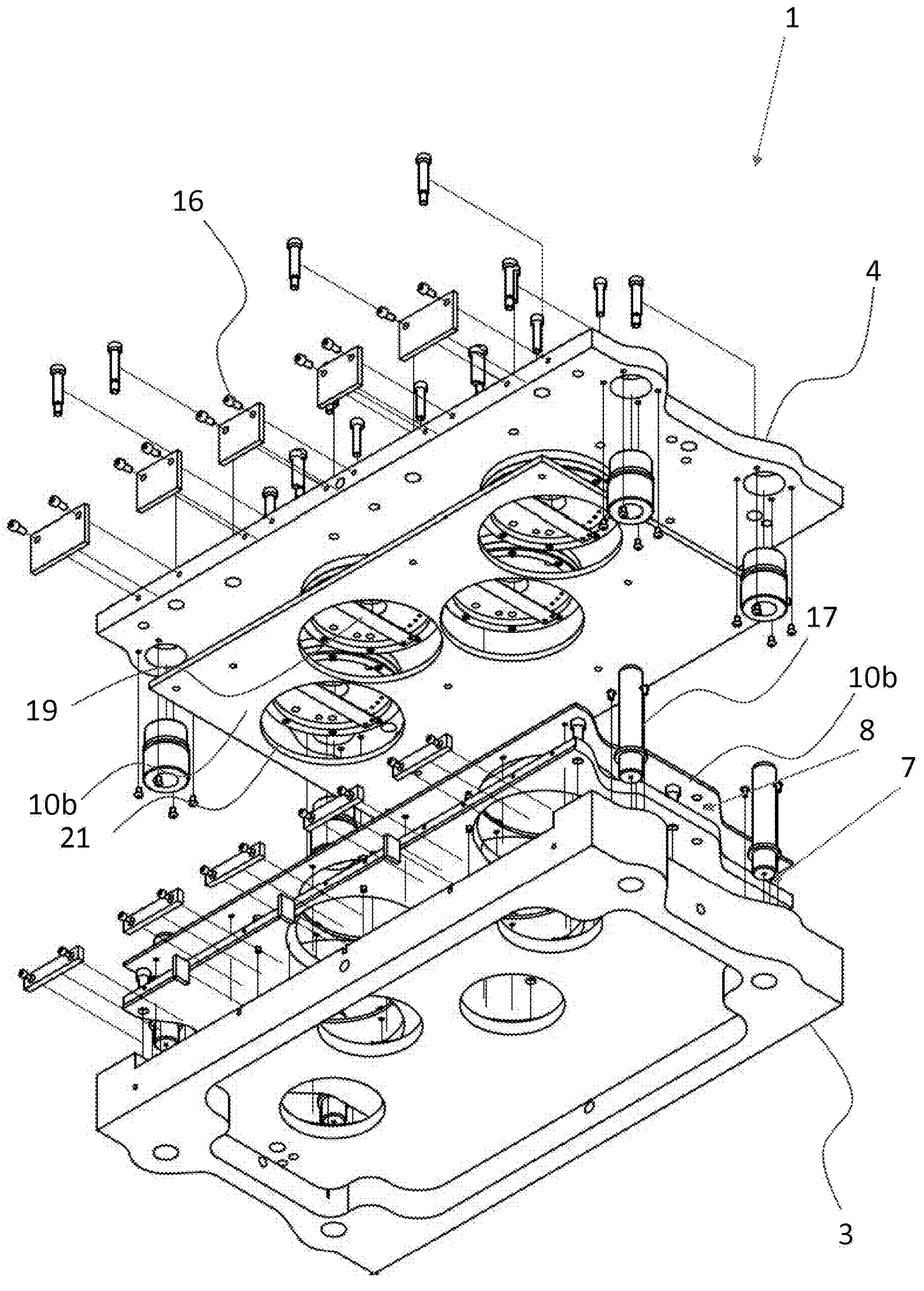
FIG. 4 illustrates a schematic exploded view of the stamping apparatus according to the invention from a lower right.
Figure 5:
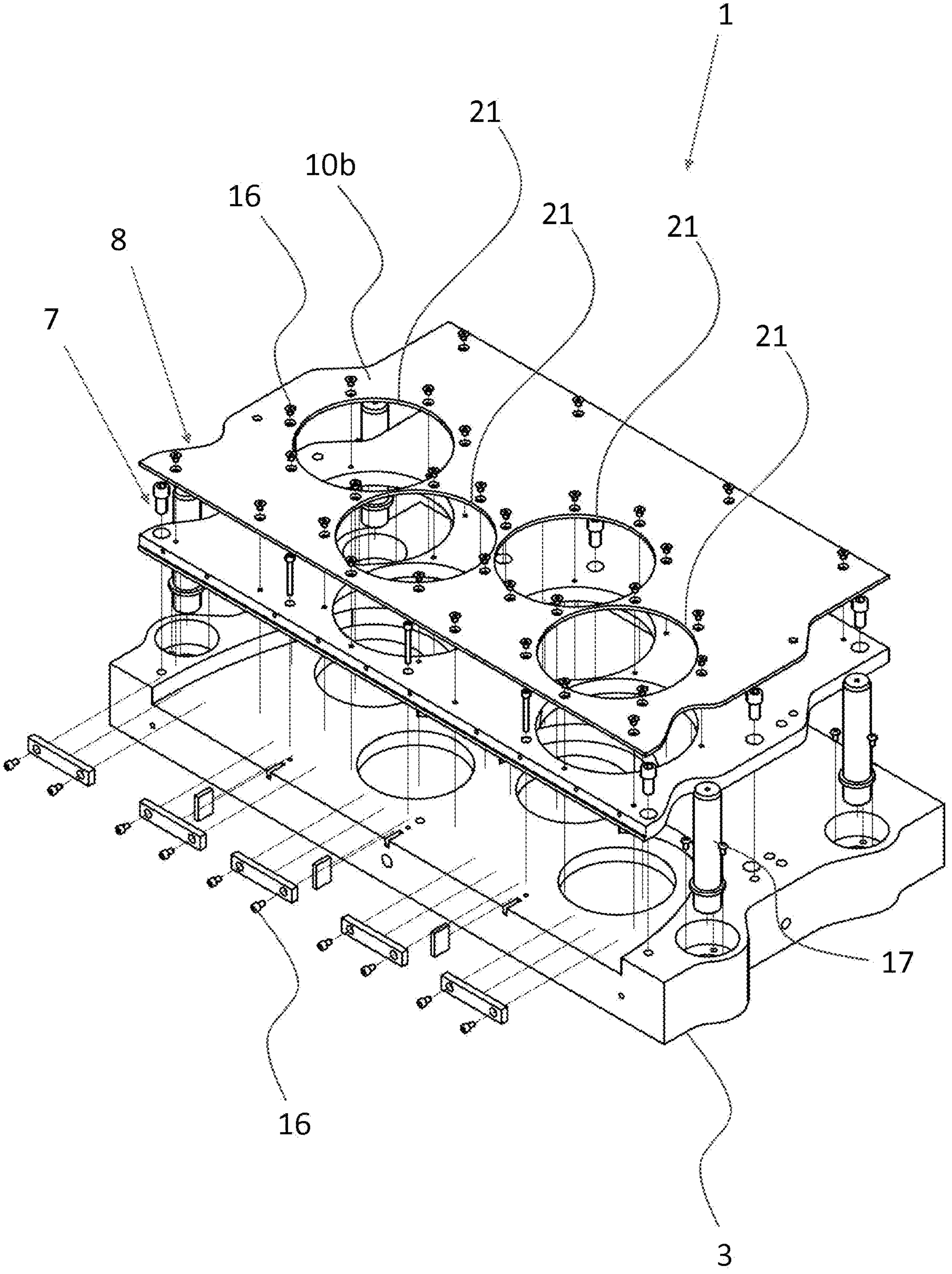
FIG. 5 illustrates a schematic exploded view of a lower part of the stamping apparatus according to the invention.

As evident from FIG. 3 the stamping dies 5 and the cutting elements 10*a* of the female die 8 are configured as a subassembly. This means that the female die 8 includes a cutting element 10*c* with four cutting edges 21, which, however are integrally provided in one piece. As illustrated in FIG. 3 this is a thin plate that forms four circular cutting edges 21. The plate is made from the same material all around, namely tool steel. The plate is connected with a carrier plate 22 arranged thereunder, wherein the carrier plate has a greater thickness than the cutting element 10*b*. The thin plate has a thickness of approximately 8 mm and has a thickness of approximately one inch together with the carrier plate 22. Accordingly the thinner plate is much thinner than the carrier plate 22, typically a thickness of the thinner plate is approximately 30% of a thickness of the carrier plate 22. The carrier plate 22 is made from a tool steel as well. The thin plate is bolted together with the carrier plate 22 and pinned, wherein the carrier plate 22 is bolted together and pinned with the machine frame 3.

The stamping tool 1 is configured to produce at least essentially circular blanks for paper plates. The material 2, e.g. paper or cardboard webs is fed into an intermediary space 9 in a direction 18. This is evident e.g. in FIG. 3. Thus, it is evident that the material 2 is moved above the lower part 7 and below the upper part 4. Put differently the material 2 is run between the lower part 7 and the upper part 4.

In order to stamp the material into a predetermined shape, in particular at least essentially a circle with a predetermined diameter the male die 6 is moved up and down in cycles and penetrates the female die 8 over and over again. Thus, the male die 6 engages the material 2 with its four cutting elements 10*a* and presses the material into the into the female die 8 including four cutouts respectively defined by a circumferential cutting edge 21 so that the material is cut and stamped. In order to facilitate the stamping the four cutting elements 10*a* of the male die 6 respectively have a diameter 15 that is slightly smaller than the diameter 16 of the female die. The cutting elements 10*a* of the male die 6 can at least partially penetrate the female die due to their diameter 15 that is smaller than a diameter 16 of the cutting edges. In order to hold the material 2 down during stamping so that the material 2 does not slide or compress a down holder 19 is provided which is essentially configured plate shaped. The down holder 19 is spring loaded and pressed the material 2 down before stamping so that it is engaged by the stamping die 5 without the material moving.

In order to be able to cut the material the stamping dies 5*o* and 5*u* respectively include a cutting element 10*a*, 10*b*. The cutting element 10*a*, 10*b* impacts the material 2 during stamping over and over again and cuts or stamps the material 2. In particular the stamping tool 5*o* of the male die 6 impacts the material 2 which is supported by the female die 8 in a downward direction. Thus, the material 2 runs through the intermediary space 9 in the direction 18 and partially rests on the female die 8 at least for a moment. The stamping tool 5*o* of the male die 6 impacts the material 2 from above so that the stamping tool contacts and engages the material at least with the cutting element 10*a*. Thereafter the material 2 is cut by the cutting element 10*a* or punched into the stamping tool 5*u* of the female die 8. Thus, the cutting element 10*a* and the cutting element 10*b* cooperate. Since large forces are at work, the cutting elements 10*a*, 10*b* wear overtime, in particular due to abrasion effects. Consequently, the cutting elements 10*a*, 10*b* have to be replaced or dismounted in order to be overhauled or exchanged.

In the instant embodiment the cutting elements 10*a*, 10*b* are fastened at the male die 6 and the female die 8 in a disengage able manner. This is evident from FIGS. 1, 2 and in particular FIG. 6. In the instant embodiment the cutting elements 10*a*, 10*b* terminate flush with a top side 13 of a respectively associated stamping tool 5*o*, 5*u*.

Figure 2:
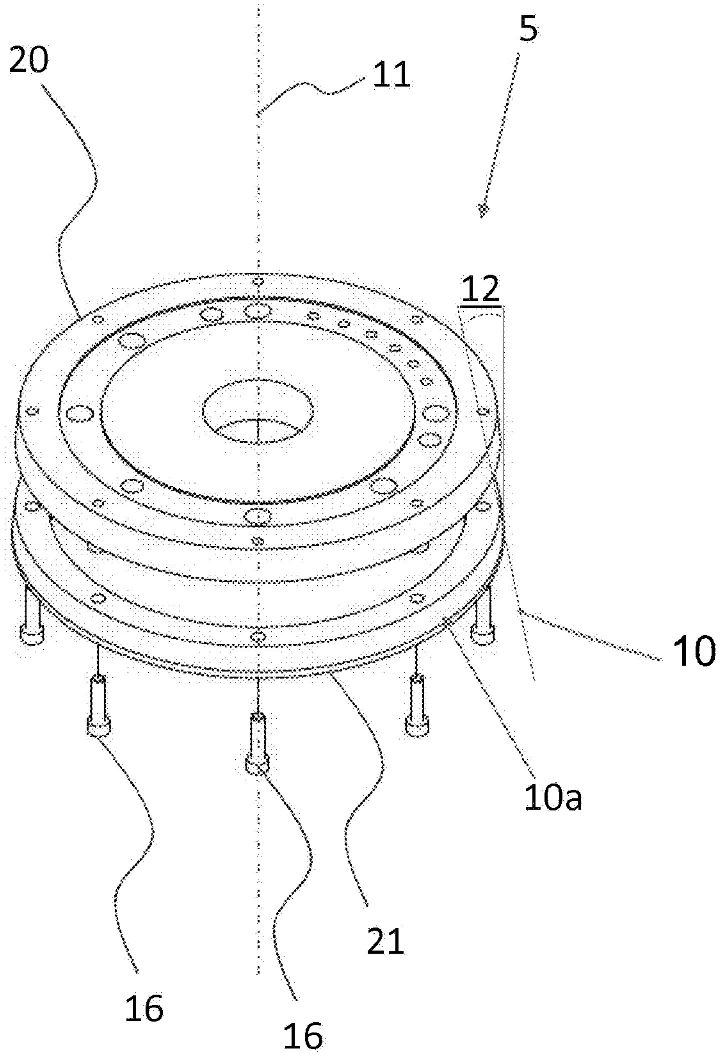
FIG. 2 illustrates a schematic perspective view of the male die of the stamping tool according to the invention from below.

It is clearly evident from FIGS. 1 and 2 that the cutting element 10*a* is attachable by bolts 16 at the stamping tool 5*o* configured as the male die 6. The stamping tool 5*o* includes a base element 20. The base element 20 includes a centering element 24 configured in particular as a centering collar so that the cutting element 10*a* can be aligned at the centering collar. Thus, the cutting element 10*a* is arranged at the stamping tool 5 configured as the male die 6 so that the cutting element is also correctly aligned to cooperate with the female die 8, this means the male die 6 can engage and penetrate the female die 8. This also applies for the cutting element 10*b* at the stamping tool 5 configured as the female die 8 as evident from FIG. 3. Thus, the cutting element 10*a*, 10*b* can be replaced by itself when worn by loosening the bolt 16 and dismounting the cutting element 10*a*, 10*b*. In this context the cutting element 10*a*, 10*b* is disengaged from the base element 20 by loosening the bolts 16. Using the bolts 16 a new or overhauled cutting element 10*a*, 10*b* can be subsequently mounted without aligning the stamping tool 5 again. This is due to the fact that the male die 6 with the individual stamping tools is aligned before start up so that the male die 6 can engage the female die 8. Since the cutting element 10*a*, 10*b* can be mounted by the bolts 16 essentially without clearance, the male die 6 does not have to be realigned thereafter.

As evident from FIG. 2 the cutting element 10*a* is configured conical so that an enveloping line 10 encloses an angle 12 with an axis 11. This assures that the cutting element 10*b* can slide into the male die 8 with an undercut.

Figure 6:
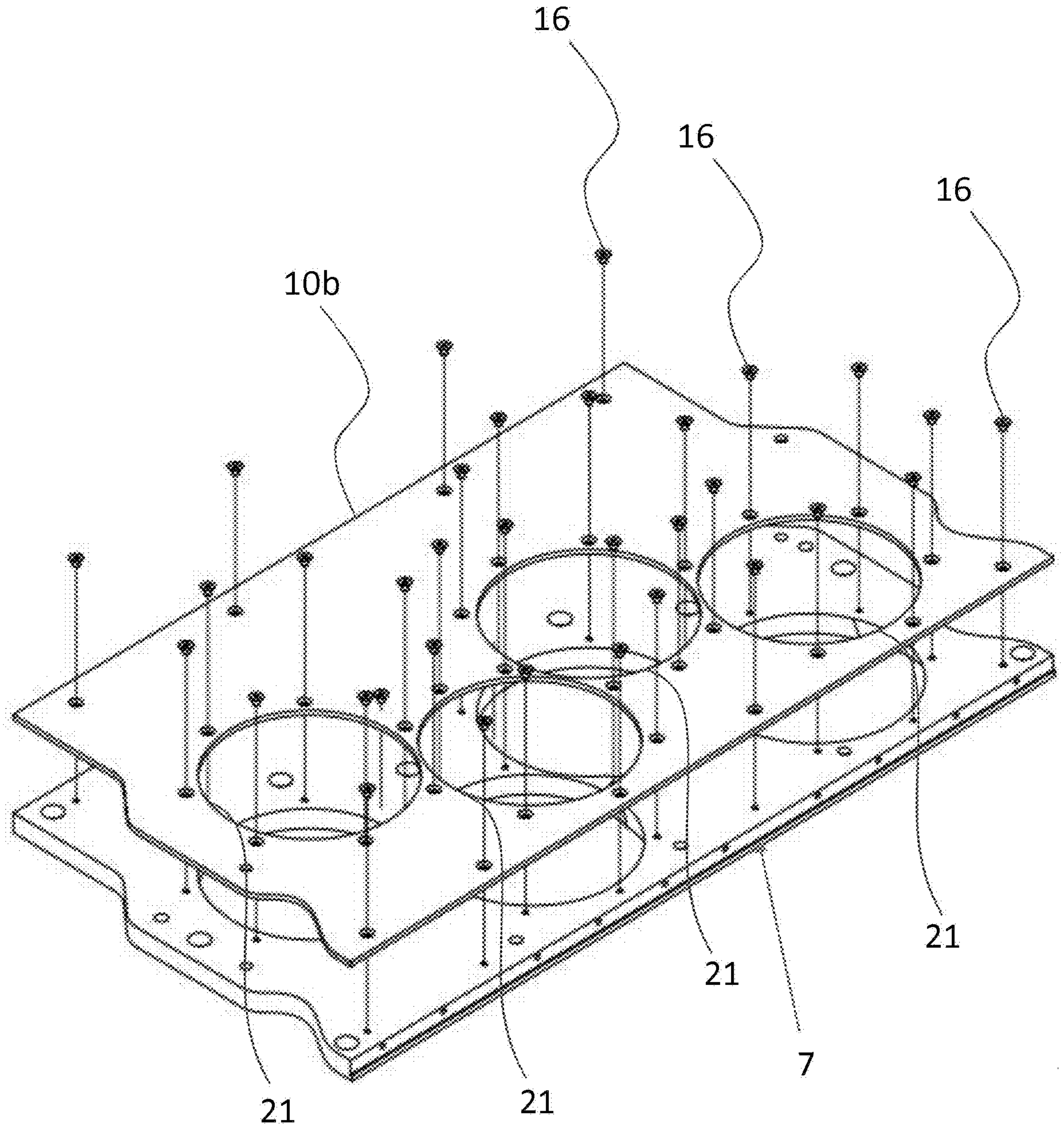
FIG. 6 illustrates a schematic exploded view of the female die of the stamping tool including a cutting element.
Figure 7:
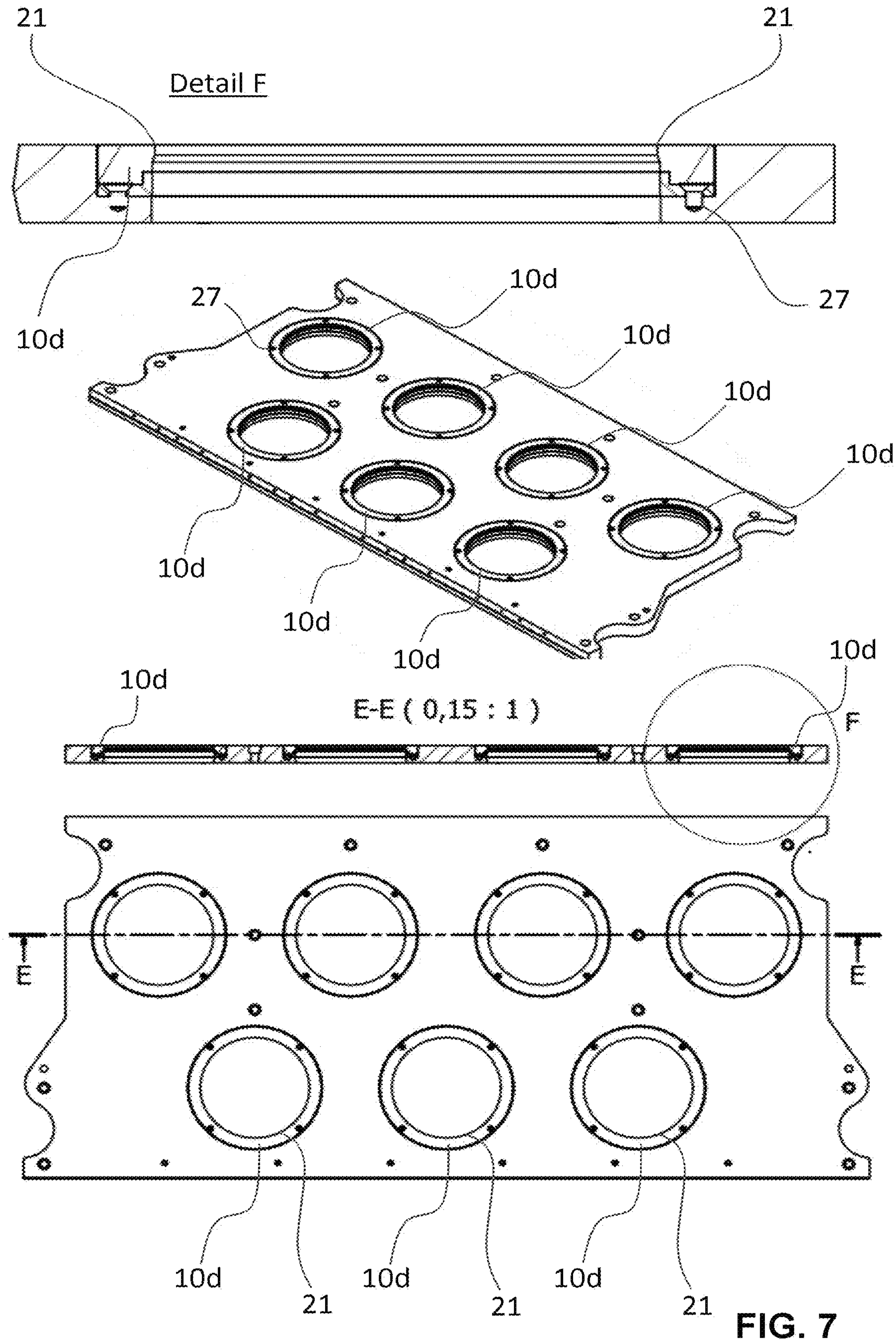
FIG. 7 illustrates a schematic perspective view and sectional view of a stamping apparatus according to another embodiment, wherein the female die includes plural cutting elements.
Figure 8:
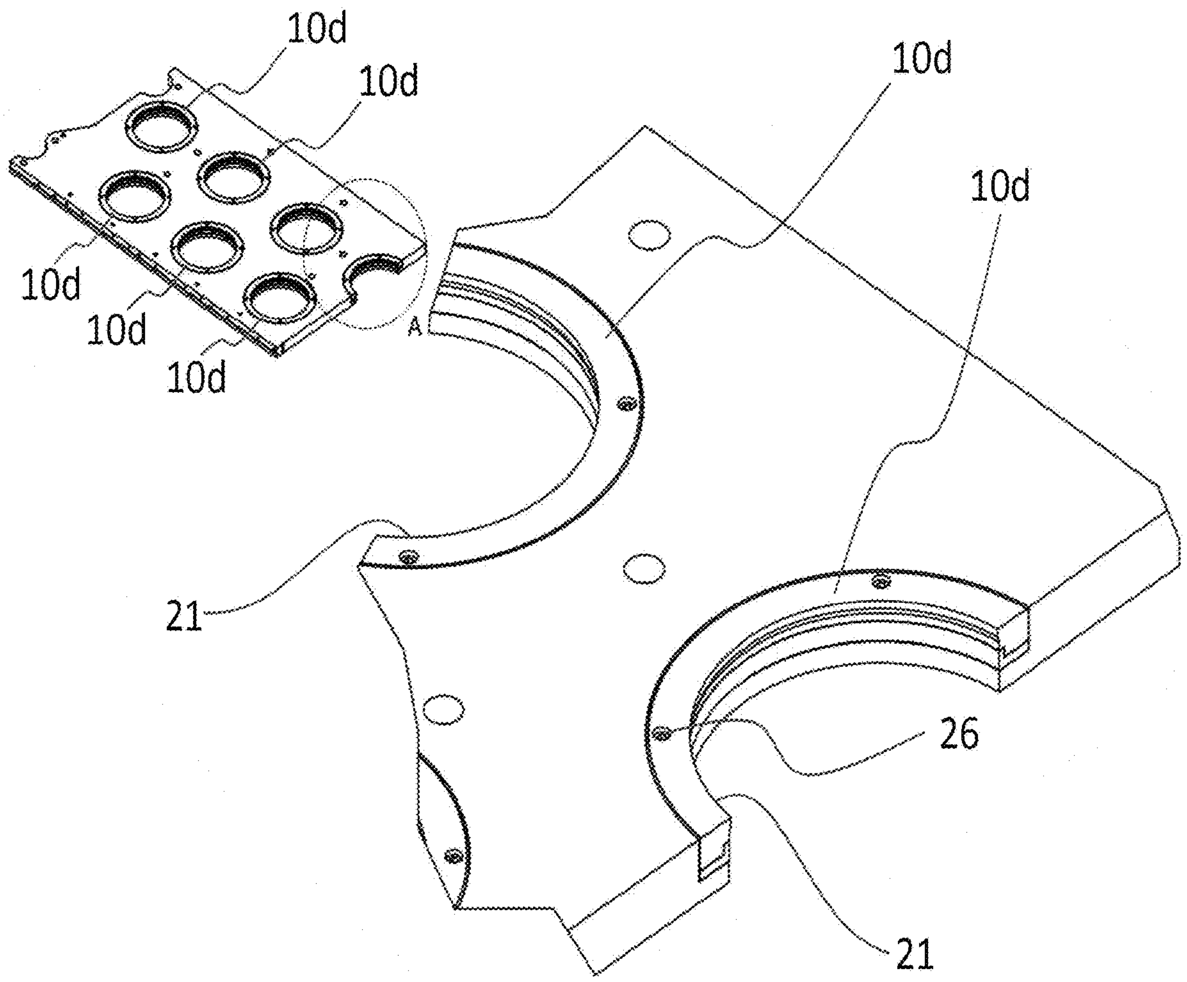
FIG. 8 illustrates a detail view of the female die according to FIG. 7.
Figure 9:
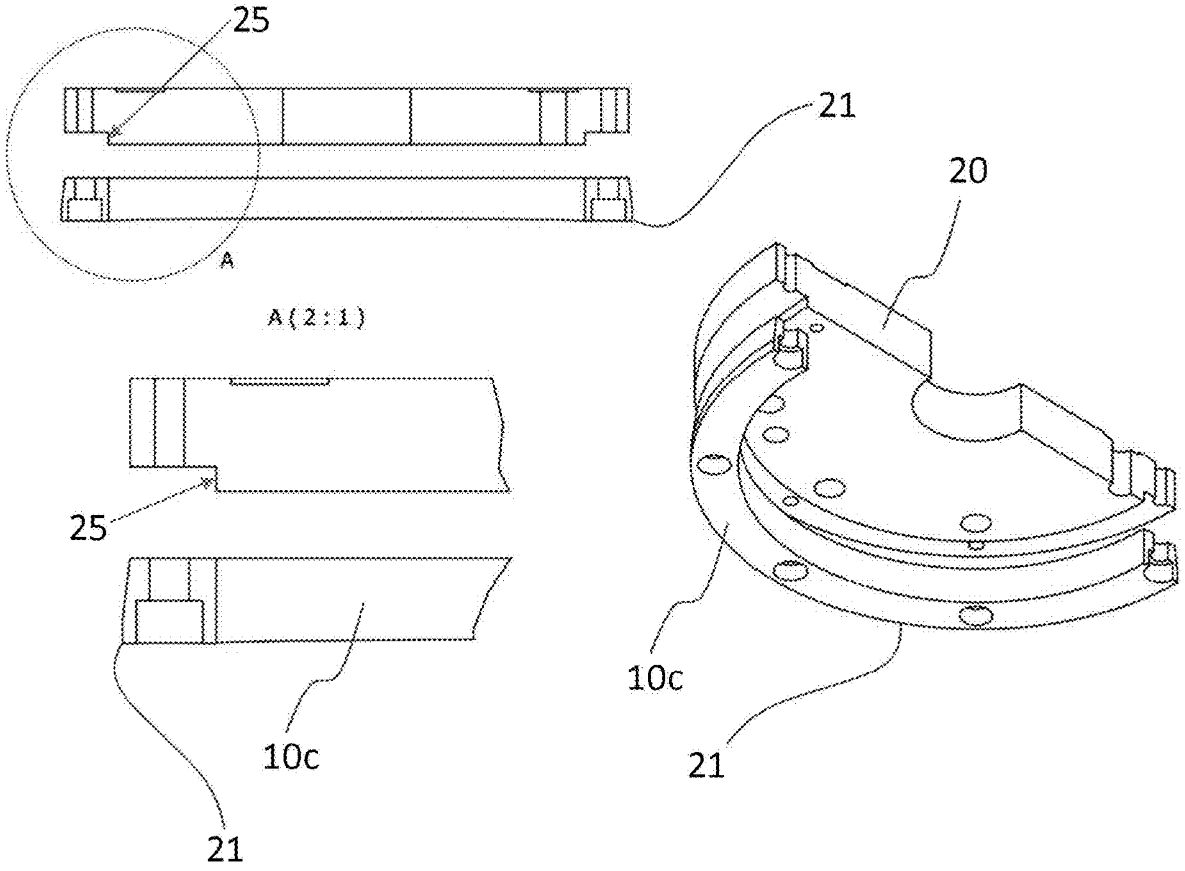
FIG. 9 illustrates a schematic perspective view from below and a sectional view of a stamping apparatus including a male die according to another advantageous embodiment.
Figure 10:
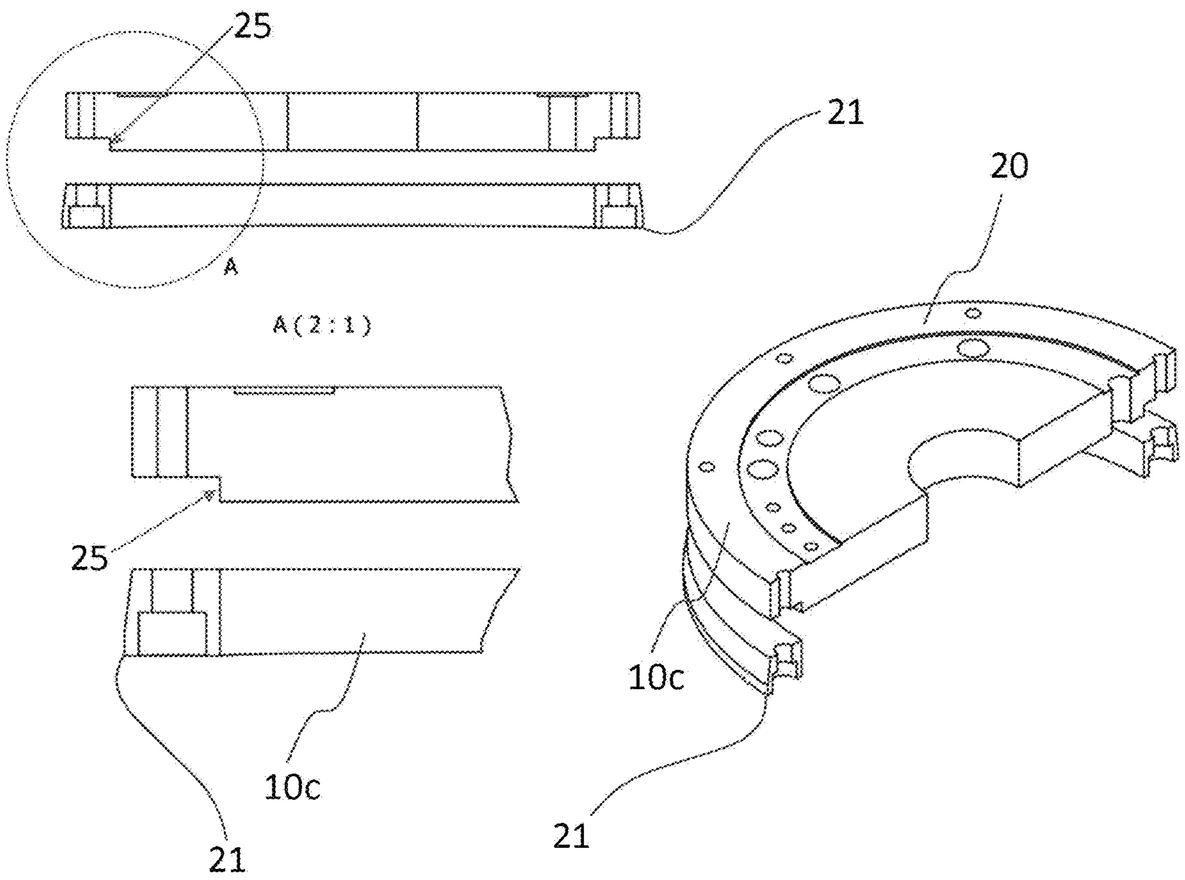
FIG. 10 illustrates the stamping apparatus of FIG. 9 from above.

FIGS. 7-13 show an alternatively embodiment of the stamping apparatus 1 according to the invention. Differently from the embodiment, shown in FIG. 6 the female die 8 does not include a cutting element 10*b* with plural cutting edges 21 but plural cutting elements 10*d* respectively including a cutting edge 21. This is clearly evident from FIGS. 6 and 7 in combination. The plate shaped cutting element 10*b* shown in FIG. 6 is therefore omitted since the cutting elements 10*d* are inserted into the carrier plate 22 at least indirectly. Put differently plural cutting elements 10*d* are used that are arranged in the carrier plate 22 itself instead of a single plate shaped cutting element 10*b* that is arranged on the carrier plate 22 and that includes plural cutting edges 21.

Figure 12:
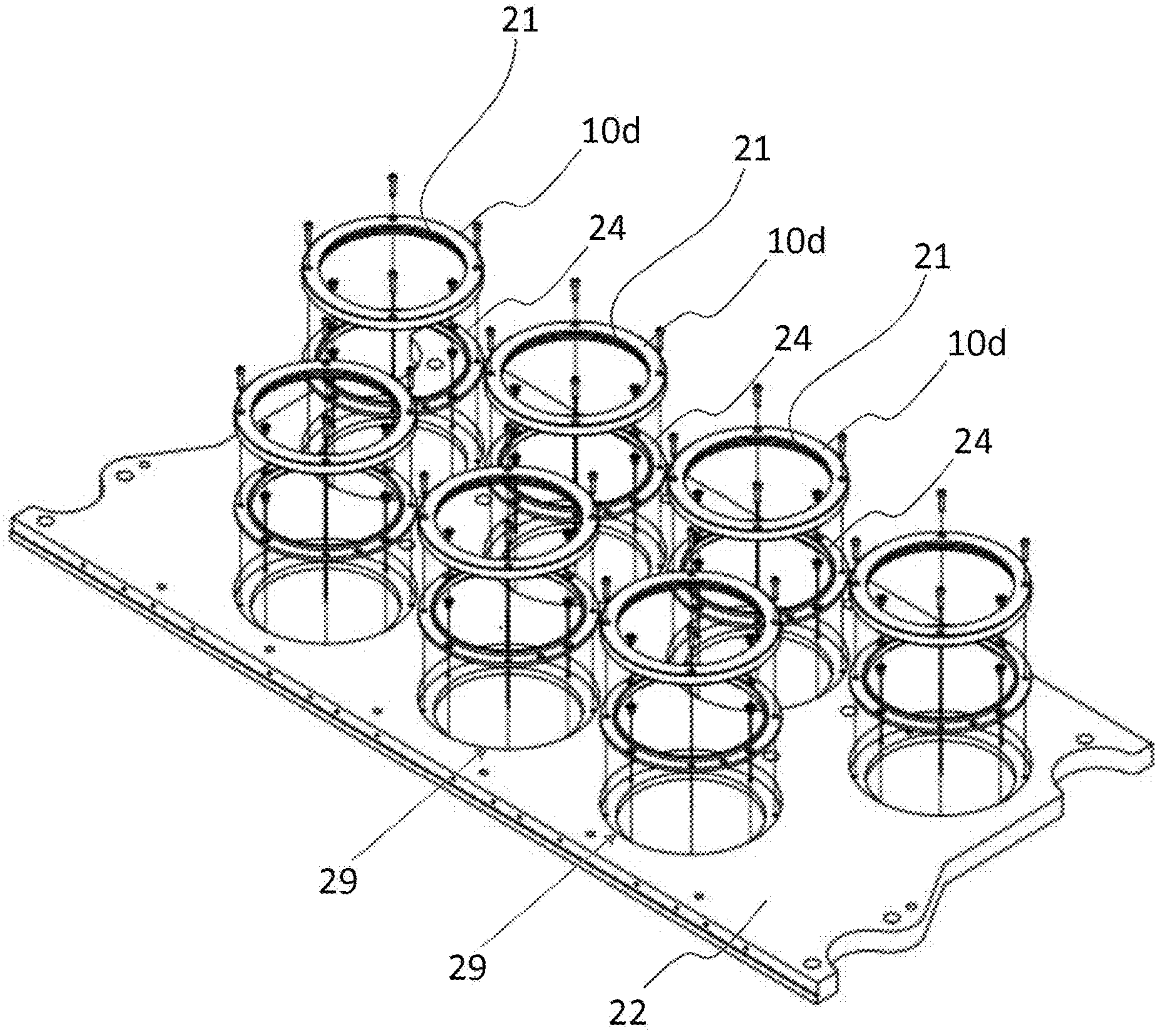
FIG. 12 illustrates a schematic exploded view of a female die according to another embodiment.
Figure 13:
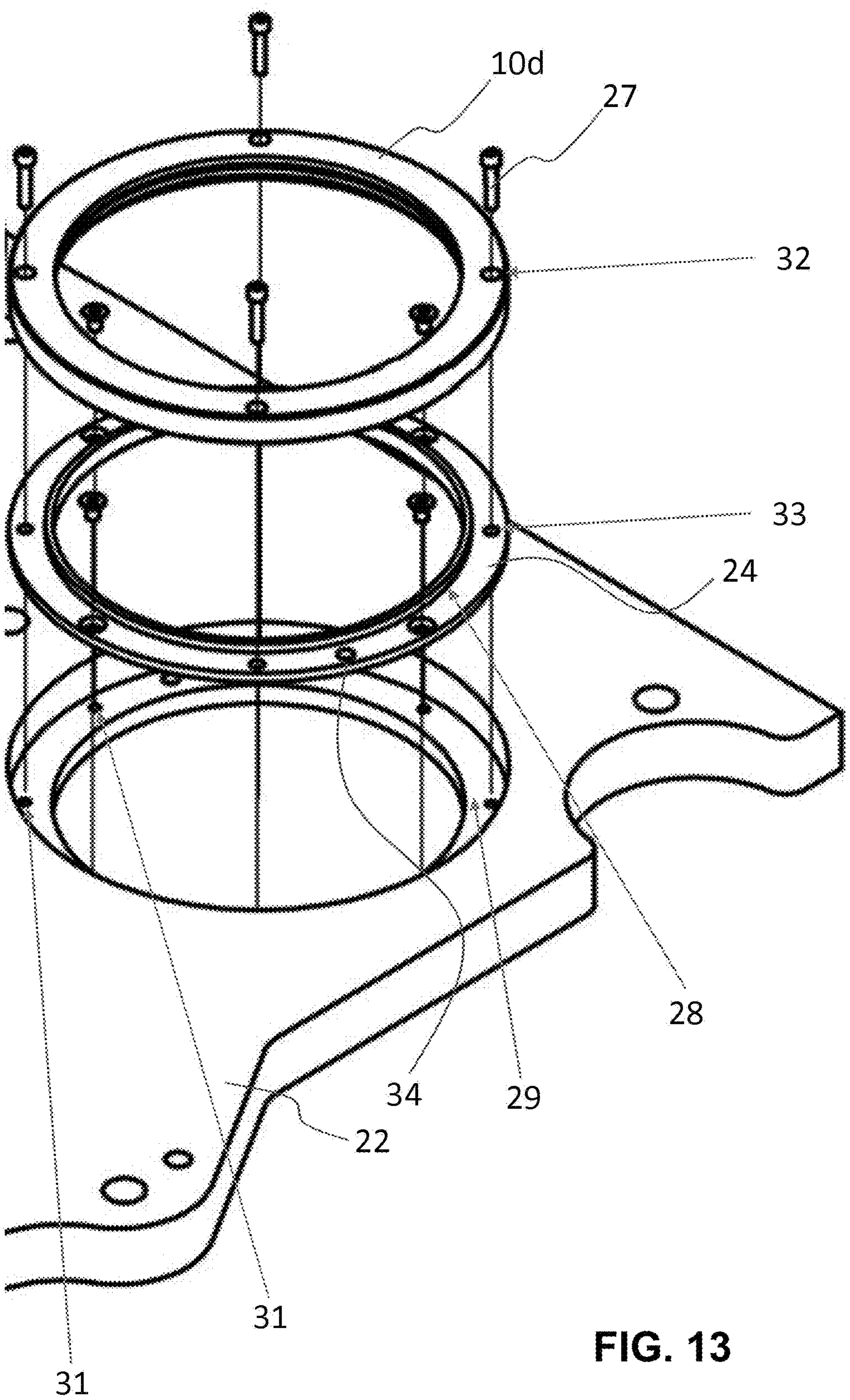
FIG. 13 illustrates a schematic detail view of FIG. 12.

It is evident from FIGS. 12 and 13 how the cutting elements 10*d* are arranged in the carrier plate 22. As shown in these drawing figures, the carrier plate 22 includes a centering recess 29. Furthermore a centering element 24 is provided which is configured annular and associated with each cutting element 10*d*, as illustrated in FIG. 12. In this context the centering recess 29 as well as the centering element 24 are configured annular or cylindrical, thus so that the centering element 24 can be arranged in the centering recess 29 or be inserted therein. Thus, the centering recess 29 is sized so that the centering element 24 has some clearance, thus so that it can be moved laterally.

Figure 11:
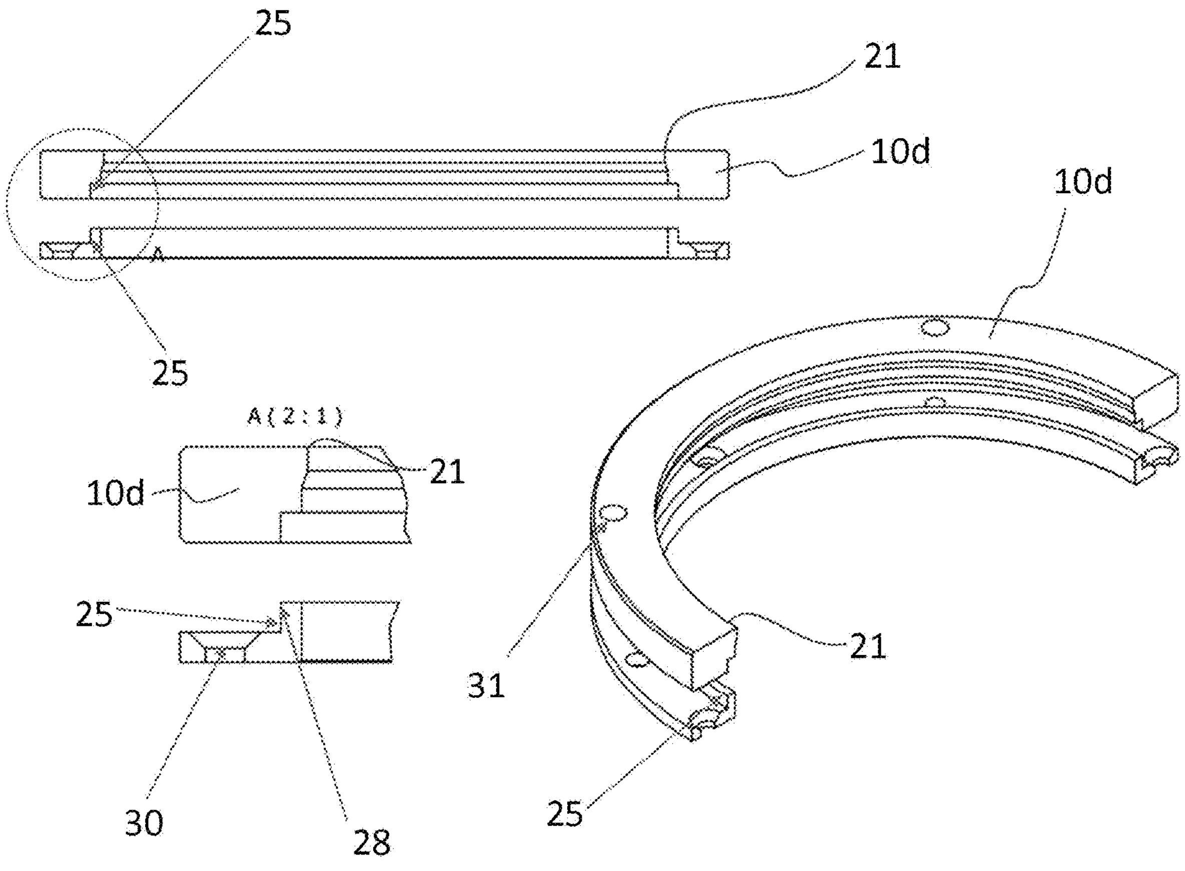
FIG. 11 illustrates a schematic perspective view from above and a sectional view of a cutting element of a male die according to another advantageous embodiment.

FIG. 11 furthermore shows the centering element 24 includes a bolt receiver 30 configured to receive a bolt head. In the instant embodiment the bolt receiver 30 is configured to receive a bolt with a recessed flush cone head.

Accordingly the carrier plate 22 includes plural bolt receivers 31 where a bolt can be received or inserted. This way it is possible to connect, the centering element 24 with the carrier plate 22 namely by threading bolts through the bolt receivers 30 of the centering element 24 into the carrier plate 22. Consequently the carrier elements 24 can be arranged at the carrier plate 22 in a disengageable manner.

The centering element 24 and the cutting element 10*d* respectively include a corresponding fit so that the elements can be precisely aligned relative to each other. Thus, the centering element 24 includes a centering collar 28 where the cutting element 10*d* can be applied precisely fitted. This is shown clearly in FIG. 11. Put differently, the cutting element 10*d* is attached at least indirectly at or in the carrier plate 22, namely by the annular centering element 24.

As evident from FIGS. 12 and 13, the cutting elements 10*d* include four bolt receivers 32. These are evenly spaced about a circumference, this means at angular positions of 90 degrees, 180 degrees, 270 degrees and 360 degrees.

Additionally, the centering element 24 includes four pass through openings 33 which can be configured e.g. as pass through bore holes or threaded bore holes. These are circumferentially spaced at uniform increments, this means in particular at angular positions at 90 degrees, 180 degrees, 270 degrees and 360 degrees. This way the centering element 24 and the cutting element 10*d* are alignable relative to each other so that the bolt receivers 32 of the cutting element 10*d* are positioned exactly over the pass through openings 33 of the centering element 24. Additionally the bolt receivers 31 are arranged in the centering recess 29 of the carrier plate 22 at even circumferential increments, this means in particular at angular positions of 90 degrees, 180 degrees, 270 degrees and 360 degrees so that the bolt receivers 31 with the pass through openings 33 of the centering element 24 and the bolt receivers 32 of the cutting element 10*d* are arranged on top of each other. Put differently a bolt can be inserted through the bolt receiver 32 of the cutting element 10*d* through the pass through opening 33 of the centering element 24 and fastened through the bolt receiver 31 in the carrier plate. Thus, the cutting element 10*d* is attached at or in the carrier plate 22 at least indirectly. Furthermore the centering element 24 is connected with the carrier plate 22 by centering pins. Thus, the centering element 24 includes two centering bore holes 34 arranged opposite to each other and configured to receive the centering pins. The front centering bore hole 34 is clearly evident in FIG. 13 whereas the opposite centering hole is covered by the cutting element 10*d*.

In order for the cutting element 10*c* and the cutting element 10*d* to cooperate, the male die 6 and the female die 8 are aligned relative to each other. Furthermore the cutting element 10*c* is aligned relative to the male die 6 and the cutting element 10*d* is aligned relative to the female die 8.

Thus, the stamping tools 5*o* are initially inserted into the female die 8. Thus the stamping tool 5*o* is arranged inside the female die 8 so that it is arranged the same way as during operations, namely when the stamping tool 5*o* of the male die 6 penetrates the stamping tool 5*u* of the female die 8.

In this condition the centering element 24 can be aligned within the carrier plate 22 of the female die 8 and can be attached so that the stamping tool 5*o* and the centering element 24 or the cutting element 10*d* arranged thereon are aligned relative to one another for a minimum amount of friction. Thus, the stamping tool 5*o* is pulled just high enough so that it penetrates into the female die 8 by about 3 mm. This way the cutting edge 21 of the cutting element 10*c* contacts the cutting edge 21 of the cutting element 10*d* so that they are aligned relative to each other. In this condition the cutting edges 10*c*, 10*d* are aligned relative to each other in an optimum manner so that the position shall be fixed. Accordingly the centering element 24 is attached at the carrier plate 22 by threaded elements 26. Since the centering element 24 and the cutting element 10*d* include matched fits 25 aligning the centering element 24 fixes a position of the cutting element 10*d* at least indirectly.

Subsequently the upper stamping tools 5*o* are attached as determined during the alignment with the female die 8. For this purpose the male die 6 is moved up and rotated by the stamping device 1 so that it is easily accessible for an operator. Put differently the male die 6 can be rotated so that a bottom side is accessible. This way the stamping dies 50 can be permanently aligned relative to the male die by fits. The required fit bores can be produced by a magnet drill that is placed onto a bottom side of the male die 6 so that a bore hole can be introduced into the male die 6 accordingly. Fitting bore holes provided in the stamping tool 5*o* facilitate precise alignment of the stamping tool 5*o* relative to the male die 6. Since the stamping tool 5*o* is aligned relative to the male die 6 and the cutting element 10*c* is also precisely aligned relative to the stamping tool 5*o* by the fit 25 it is assured that the cutting element 10*c* is positioned precisely relative to the cutting element 10*d* and can cooperate there-with.

REFERENCE NUMERALS AND DESIGNATIONS

1 stamping device
2 material
3 machine frame
4 upper part
5*o* stamping tool
5*u* stamping tool
6 male die
7 lower part
8 female die
9 intermediary space
10*a* cutting element
10*b* cutting element
10*c* cutting element
10*d* cutting element
10 enveloping line
11 axis
12 angle
13 top side
14 diameter stamping tool male die
15 diameter stamping tool female die
16 bolt
17 alignment pin
18 direction
19 down holder
20 base element
21 cutting edge
22 carrier plate
23 centering element
24 centering element
25 fit
26 threaded element
27 threaded element
28 centering collar
29 centering recess
30 bolt receiver (centering element)
31 bolt receiver (carrier plate)
32 bolt receiver (cutting element)
33 pass through opening (centering element)
34 centering bore hole

What is claimed is:

1. A stamping apparatus configured to stamp a material configured as a flat paper or cardboard web, the stamping apparatus comprising:
- a machine frame;
- an upper part including at least one upper stamping tool configured as a male die; and
- a lower part including at least one lower stamping tool configured as a female die wherein the upper part is arranged movable on a linear path relative to the machine frame,
- wherein the lower part is fixed at the machine frame,
- wherein an intermediary space is provided between the male die and the female die,
- wherein the material to be stamped is movable through the intermediary space in a direction perpendicular to a direction of a relative movement between the upper part and the lower part,
- wherein the material to be stamped is stampable by the relative movement between the upper part and the lower part due to an engagement of at least one upper stamping tool of the upper part in an associated at least one lower stamping tool of the lower part,
- wherein each of the at least one upper stamping tool and the at least one lower stamping tool include least one cutting element respectively including at least one circumferential cutting edge and wherein at least one cutting edge arranged in the upper part cooperates with at least one cutting edge arranged in the lower part as opposite cutting edge,
- wherein the at least one cutting element is connected with the at least one upper stamping tool and the at least one lower stamping tool in a disengageable manner.

2. The stamping apparatus according to claim 1, wherein the upper part includes plural upper stamping tools respectively including a cutting element.

3. The stamping apparatus according to claim 2, wherein upper part Includes a carrier plate where the plural upper stamping tools are attached so that they protrude beyond the carrier plate in a direction towards the lower part.

4. The stamping apparatus according to claim 1, wherein the female die includes exactly one cutting element including plural cutting edges.

5. The stamping apparatus to claim 4,
- wherein the exactly one cutting element is configured plate shaped and contacts a parallel carrier plate flat and is connected with the parallel carrier plate,
- wherein the parallel carrier plate includes cut outs into which the cutting elements of the male die are configured to penetrate.

6. The stamping apparatus according to claim 1, wherein the male die includes plural cutting elements respectively including at least one cutting edge.

7. The stamping apparatus according to claim 1, wherein the at least one cutting element is configured conical so that a surface line in a sectional view transversal to an axial direction of the at least one cutting element is at an angle relative to the axial direction.

8. The stamping apparatus according to claim 1, wherein the at least one cutting element terminates flush with a top side of the at least one upper stamping tool.

9. The stamping apparat us according to claim 1, further comprising a separation plane between the at least one upper stamping tool and the at least one cutting element, wherein the separation plane is orthogonal to a direction of a relative movement between the upper part and the lower part.

10. The stamping apparatus according to claim 1, the at least one cutting edge of at least one of the cutting element is configured circumferentially closed.

11. The stamping apparatus according to claim 1, further comprising: a centering element configured as a centering pin through which the at least one cutting element is alignable in a defined position at a base element of the at least one upper stamping tool and the at least one lower stamping tool.

12. The stamping apparatus according to claim 1, further comprising: a centering element configured to center the at least one cutting element.

13. The stamping apparatus according to claim 12, wherein the centering element includes a centering collar.

14. The stamping apparatus according to claim 13, further comprising: a centering recess configured to receive the centering element.

15. The stamping apparatus according to claim 1, wherein the at least one cutting element of the upper part or the at least one cutting element of the lower part is annular, circular ring shaped or frame shaped.

16. The stamping apparatus ding to claim 1, further comprising:

at least one annular or circular ring shaped centering element arranged between the at least one cutting element and a base element of the upper part or the lower part, and wherein the at least one annular or circular ring shaped centering element and the at least one cutting element are fixable at one another by positive form locking against a movement in a direction perpendicular to the direction of a relative movement between the upper part and the lower part, but movable as a subassembly relative to the base element in various directions relative to the direction of the relative movement between the upper part and the lower part and are movable into different positions relative to the base element where they are fixable.

* * * * *